US012687625B2

(12) United States Patent
Sueyoshi

(10) Patent No.: US 12,687,625 B2
(45) Date of Patent: Jul. 21, 2026

(54) DISTANCE MEASURING DEVICE, IMAGING DEVICE, AND DISTANCE MEASURING METHOD

(71) Applicant: CANON KABUSHIKI KAISHA, Tokyo (JP)

(72) Inventor: Yuichi Sueyoshi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 252 days.

(21) Appl. No.: 18/582,971

(22) Filed: Feb. 21, 2024

(65) Prior Publication Data

US 2024/0295646 A1 Sep. 5, 2024

(30) Foreign Application Priority Data

Mar. 3, 2023 (JP) ................................. 2023-033169

(51) Int. Cl.
| *G01S 11/12* | (2006.01) |
| *G01C 3/08* | (2006.01) |
| *G06T 7/00* | (2017.01) |

(52) U.S. Cl.
CPC .............. *G01S 11/12* (2013.01); *G01C 3/085* (2013.01); *G06T 7/97* (2017.01); *G06T 2207/10021* (2013.01)

(58) Field of Classification Search
CPC . G01S 11/12; G06T 7/97; G06T 2207/10021; G01C 3/085
See application file for complete search history.

(56) References Cited

U.S. PATENT DOCUMENTS

| 9,204,128 | B2 | 12/2015 | Morioka | |
| 12,069,234 | B2 | 8/2024 | Oigawa | |
| 2013/0010106 | A1 | 1/2013 | Yokota | |
| 2013/0342641 | A1 | 12/2013 | Morioka | |
| 2018/0316909 | A1* | 11/2018 | Tsubaki | H04N 13/282 |
| 2019/0128669 | A1 | 5/2019 | Nobayashi | |
| 2019/0254535 | A1* | 8/2019 | Harmelin | G06T 7/55 |
| 2020/0065987 | A1 | 2/2020 | Hikosaka | |
| 2020/0108774 | A1 | 4/2020 | Hashimoto | |

(Continued)

FOREIGN PATENT DOCUMENTS

| EP | 3279691 | A1 * | 2/2018 | ............. G01S 17/86 |
| EP | 4067813 | A1 | 10/2022 | |

(Continued)

OTHER PUBLICATIONS

Sep. 23, 2024 European Official Action in European Patent Appln. No. 24160168.1.

(Continued)

*Primary Examiner* — Pinalben Patel
(74) *Attorney, Agent, or Firm* — Venable LLP

(57) ABSTRACT

A distance measuring device includes a first imaging element having a first pixel having a plurality of photoelectric conversion regions, a second imaging element having a second pixel and having a first parallax in a first direction between the second imaging element and the first imaging element, and distance measuring means for generating integrated distance measuring information based on signals output from the first imaging element and the second imaging element, and the plurality of photoelectric conversion regions have a second parallax in a second direction intersecting the first direction.

1 Claim, 9 Drawing Sheets

(56)                References Cited

U.S. PATENT DOCUMENTS

2020/0320728 A1 * 10/2020 Tsunashima ........... G01C 11/14
2022/0321871 A1    10/2022 Oigawa
2023/0199329 A1     6/2023 Sueyoshi

FOREIGN PATENT DOCUMENTS

JP          H10-038561 A      2/1998
JP            3456843 B2    10/2003
JP           2012083330 A  *  4/2012    .............. G01C 3/00
JP           2017167126 A  *  9/2017
JP          2018-189489 A    11/2018
WO         2013/099169 A1    7/2013

OTHER PUBLICATIONS

Aug. 1, 26, 2025 Japanese Official Action in Japanese Patent Appln. No. 2023-033169.
Feb. 3, 2026 Japanese Official Action in Japanese Patent Appln. No. 2023-033169.
Jan. 7, 2026 European Official Action in European Patent Appln. No. 24160168.1.

* cited by examiner

START

S501

DIVIDE ONE INPUT IMAGE

S502

CALCULATE PARALLAX FOR EACH REGION

S503

CALCULATE DISTANCE FOR EACH REGION

S504

OUTPUT DISTANCE MEASURING VALUE AS MAP

END

START

S511

SELECT DISTANCE MEASURING VALUE FOR EACH REGION

S512

OUTPUT DISTANCE MEASURING VALUE AS MAP

END

FIG. 6

DISTANCE MEASURING DEVICE, IMAGING DEVICE, AND DISTANCE MEASURING METHOD

BACKGROUND OF THE INVENTION

Field of the Invention

The present disclosure relates to distance measuring technology using an imaging device.

Description of the Related Art

In recent years, numbers of vehicles that measure a distance between a host vehicle and surrounding objects for the purpose of autonomous vehicle driving or driving assistance have increased. A stereo camera is known as such a distance measuring device. A stereo camera is constituted by two cameras, and can calculate a distance to an object using parallax information obtained by comparing contrast edges and color edges extracted from images captured by both the cameras, and an interval (baseline length) between both the cameras.

A typical stereo camera measures a distance from a parallax in the horizontal direction by disposing two cameras side by side in a horizontal direction. In this case, it becomes difficult to obtain a parallax from edges extending in the horizontal direction. For this reason, in an environment with a large number of edges in the horizontal direction, there is a concern that sufficient parallax information may not be able to be obtained and the accuracy of distance measurement may deteriorate. When considering a typical driving environment on the assumption that a stereo camera mounted on a vehicle is used, there are many objects, such as a preceding vehicle and guardrails, which are captured by a camera and have more edges in the horizontal direction than in the vertical direction. For this reason, in the stereo camera mounted on the vehicle, it is not necessarily optimal to obtain a parallax in the horizontal direction.

With respect to the above-described problem, Japanese Patent No. 3456843 discloses technology for acquiring a parallax in a vertical direction and measuring a distance by installing two cameras vertically side by side on a rear-view mirror and a dashboard inside a vehicle.

However, a device disclosed in Japanese Patent No. 3456843 cannot obtain a parallax in the horizontal direction, and thus cannot obtain a parallax from edges in the vertical direction. In this case, there is a concern that the accuracy of distance measurement may deteriorate for objects that include a large number of edges in the vertical direction, such as road signs and pedestrians. On the other hand, in order to be able to obtain a parallax from both horizontal and vertical edges, it is sufficient if two sets of stereo cameras arranged in the horizontal and vertical directions are mounted on the vehicle. However, in this case, the number of required cameras increases, resulting in increased cost and insufficient installation space.

SUMMARY OF THE INVENTION

The present disclosure provides a distance measuring device capable of performing stable distance measurement with a small number of imaging devices.

A distance measuring device according to an embodiment of the present disclosure includes a first imaging element having a first pixel having a plurality of photoelectric conversion regions, a second imaging element having a second pixel and having a first parallax in a first direction between the second imaging element and the first imaging element, a memory storing instructions, and a processor executing the instructions causing the distance measuring device to generate integrated distance measuring information based on signals output from the first imaging element and the second imaging element, in which the plurality of photoelectric conversion regions have a second parallax in a second direction intersecting the first direction.

Further features of the present invention will become apparent from the following description of exemplary embodiments with reference to the attached drawings.

BRIEF DESCRIPTION OF THE DRAWINGS

FIG. 6 is a block diagram showing a system configuration of a distance measuring device according to a second embodiment.

DESCRIPTION OF THE EMBODIMENTS

Figure 1:
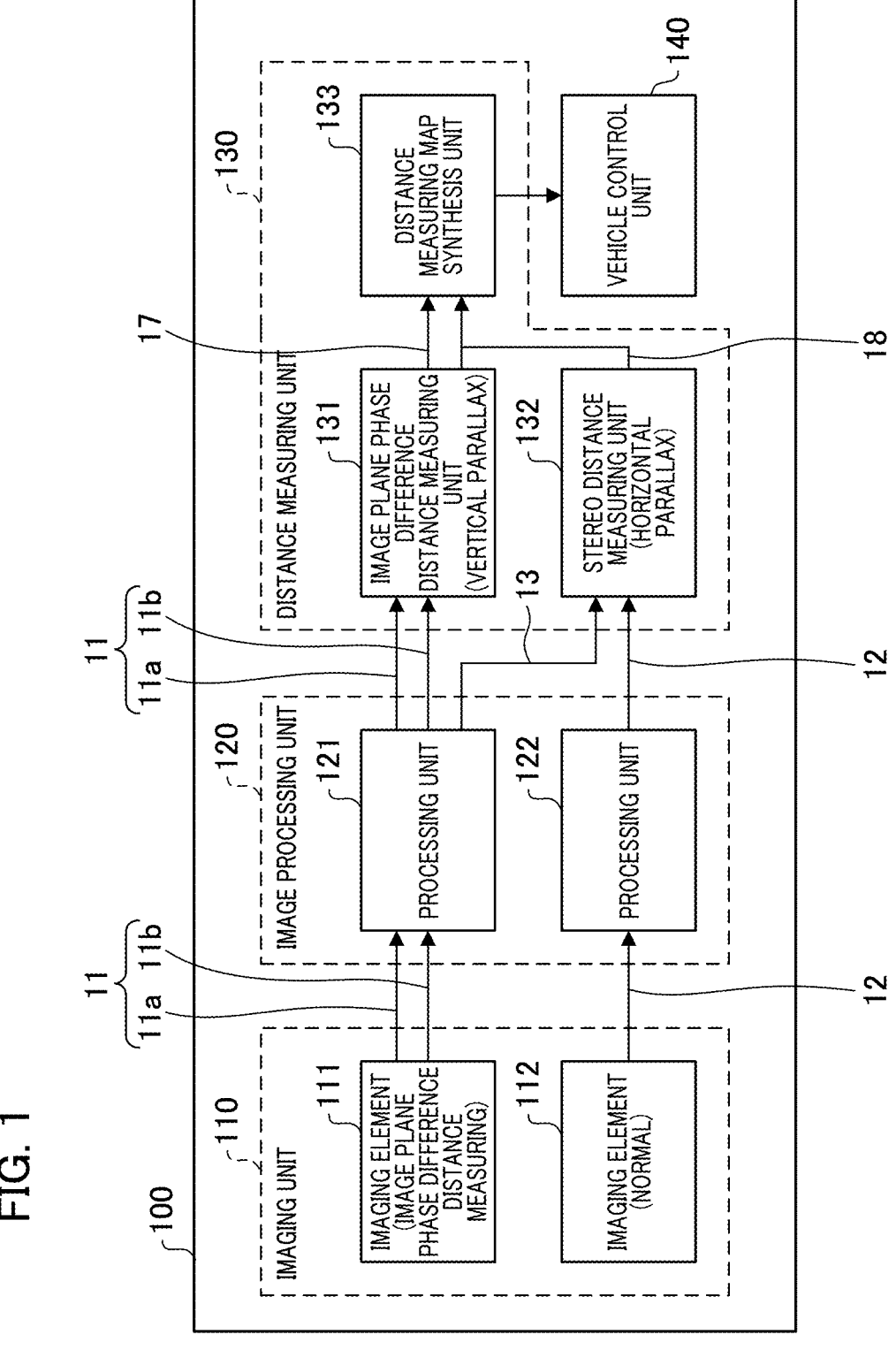
FIG. 1 is a block diagram showing a system configuration of a distance measuring device according to a first embodiment.

Embodiments of the present disclosure will be described below with reference to the drawings. In the drawings, components having the same configuration or function are denoted by the same reference numeral, and repeated description thereof will be omitted. The configurations shown in the following embodiments are merely examples, and the present disclosure is not limited to the configurations shown in the drawings.

First Embodiment (System Configuration of Distance Measuring Device)

FIG. 1 is a block diagram showing a system configuration of a distance measuring device 100 according to a first embodiment. The distance measuring device 100 constitutes a stereo camera system. The distance measuring device 100 is a device that is installed, for example, in a vehicle (as a moving object), and is capable of measuring distances to objects around the vehicle.

The distance measuring device 100 includes an imaging unit 110, an image processing unit 120, a distance measuring unit 130, and a vehicle control unit 140.

The imaging unit (imaging device) 110 is a stereo camera installed in a vehicle, and includes an imaging element (first imaging element) 111 and an imaging element (second imaging element) 112. The imaging elements 111 and 112 may be included in the same housing or may be included in different housings.

The imaging elements 111 and 112, which are both image sensors, convert an optical object image formed by an optical system, which is not shown in the drawing, into an electrical signal through photoelectric conversion, and transmit the electrical signal to the image processing unit 120 at the subsequent stage. The imaging element 111 is an imaging element capable of distance measuring based on an image plane phase difference, and is configured to independently generate an image group (first image group) 11 as two images having a parallax. Details of the configuration and function of the imaging element 111 will be described later.

The image processing unit 120 and the distance measuring unit 130 include, for example, a system on chip (SOC)/a field programmable gate array (FPGA), a CPU as a computer, and a memory as a storage medium. The CPU executes a computer program stored in the memory to perform a variety of controls on the entire system. Instead of or in addition to the SOC/FPGA and the CPU, devices such as a system in package (SiP), an application specific integrated circuit (ASIC), and a digital signal processor (DSP) may be used.

The image processing unit 120 includes a processing unit (first processing unit) 121 and a processing unit (second processing unit) 122. The processing units 121 and 122 receive and process signals received from the imaging elements 111 and 112, respectively. In this case, the image processing unit 120 functions as processing means.

The processing units 121 and 122 develop a video signal transmitted from the imaging unit 110. Furthermore, the processing units 121 and 122 perform a variety of image processing such as wide dynamic range (WDR) correction, gamma correction, look up table (LUT) processing, distortion correction, and cropping as necessary.

The processing unit 122 is configured to receive an output image 12 output from the imaging element 112 and output it to the distance measuring unit 130. The processing unit 121 is configured to receive an image group 11, which is a set of two images 11a and 11b having parallax output from the imaging element 111 as described above, and output it to the distance measuring unit 130. Furthermore, the processing unit 121 is configured to generate a calculated image (first calculated image) 13 by performing calculation processing (for example, summation) based on the two images 11a and 11b, and output it to the distance measuring unit 130.

The calculated image 13 is equivalent to an image obtained by regarding two photoelectric conversion elements (a pair of photoelectric conversion regions 210 to be described later) in the imaging element 111 as one pixel. The calculated image 13 is transmitted to a stereo distance measuring unit 132 and used for stereo distance measuring processing together with an output image 12 output from the processing unit 122. The calculated image 13 and the output image 12 constitute a second image group.

The distance measuring unit (distance measuring means) 130 is a block that generates a distance measuring map based on the video signal received from the image processing unit 120. The distance measuring unit 130 includes a stereo distance measuring unit 132, an image plane phase difference distance measuring unit 131, and a distance measuring map synthesis unit 133.

The image plane phase difference distance measuring unit 131 calculates a parallax based on the image group 11 transmitted from the processing unit 121. The stereo distance measuring unit 132 calculates a parallax based on the calculated image 13 transmitted from the processing unit 121 and the output image 12 transmitted from the processing unit 122. In these cases, the image plane phase difference distance measuring unit 131 and the stereo distance measuring unit 132 function as calculation means. The parallax calculated by the image plane phase difference distance measuring unit 131 is a parallax in the vertical direction. The parallax calculated by the stereo distance measuring unit 132 is a parallax in the horizontal direction. The directions of these parallaxes will be described later in detail. In the following, a parallax in the vertical direction will be referred to as a vertical parallax, and a parallax in the horizontal direction will be referred to as a horizontal parallax.

A method of calculating a parallax by the image plane phase difference distance measuring unit 131 and the stereo distance measuring unit 132 is, for example, a block matching method. The block matching method is a method of searching for a region with a high degree of similarity to a certain region in one image from another image, and uses a positional deviation of the region in one image with respect to the region with high similarity as a parallax.

The image plane phase difference distance measuring unit 131 and the stereo distance measuring unit 132 have functions of generating a distance measuring map (first distance measuring information) 17 and a distance measuring map (second distance measuring information) 18, respectively, which have distance information for each region of an image based on parallax information and a baseline length calculated using the principle of triangulation.

As a more preferable form, the image plane phase difference distance measuring unit 131 and the stereo distance measuring unit 132 may generate reliability information indicating how reliable the distance measuring maps are for each region in addition to the distance measuring maps 17 and 18, and may output the reliability information to the distance measuring map synthesis unit 133 together with the distance measuring maps 17 and 18. An example of a method of calculating the reliability information is, for example, a method using the degree of similarity (for example, a sum of absolute difference) at the time of searching for a region with a high degree of similarity in the block matching method described above.

The distance measuring map synthesis unit 133 generates a new distance measuring map (integrated distance measuring information) based on the distance measuring maps 17 and 18 obtained from the image plane phase difference distance measuring unit 131 and the stereo distance measuring unit 132, and transmits the new distance measuring map to the vehicle control unit 140.

An example of a method of generating a distance measuring map by the distance measuring map synthesis unit 133 is a method using the reliability information described above. In this case, the distance measuring map synthesis unit 133 compares the two distance measuring maps 17 and 18 obtained from the image plane phase difference distance measuring unit 131 and the stereo distance measuring unit 132 and adopts the distance measuring map with a higher degree of reliability for each region to generate a new distance measuring map. Alternatively, when there is a region where no parallax can be obtained (there is no image difference), the distance measuring result will be infinite, and thus the distance measuring map with a smaller distance measuring value may be adopted for each region without using reliability information. Alternatively, as another method, the distance measuring map synthesis unit 133 may preferentially select one of the two distance measuring maps 17 and 18 and complementarily select the other distance measuring result only for regions where valid distance measuring results cannot be obtained to generate a new distance measuring map.

As in the arrangement of the imaging elements 111 and 112 to be described later, in this embodiment, the image plane phase difference distance measuring unit 131 performs distance measuring based on a vertical parallax, and the stereo distance measuring unit 132 performs distance measuring based on a horizontal parallax.

The vehicle control unit 140 performs general control regarding vehicle driving such as that for an accelerator, a brake, and a steering based on the distance measuring map received from the distance measuring unit 130. In this case, the vehicle control unit 140 functions as control means for controlling a drive mechanism that drives the vehicle. Alternatively, the vehicle control unit 140 may detect an obstacle having a risk of colliding with the vehicle based on the distance measuring information, and display a warning on a display device, which is not shown in the drawing, or issue a warning sound from a speaker which is not shown in the drawing.

(Principle of Distance Measuring Based on Image Plane Phase Difference Method)

Figure 2A:
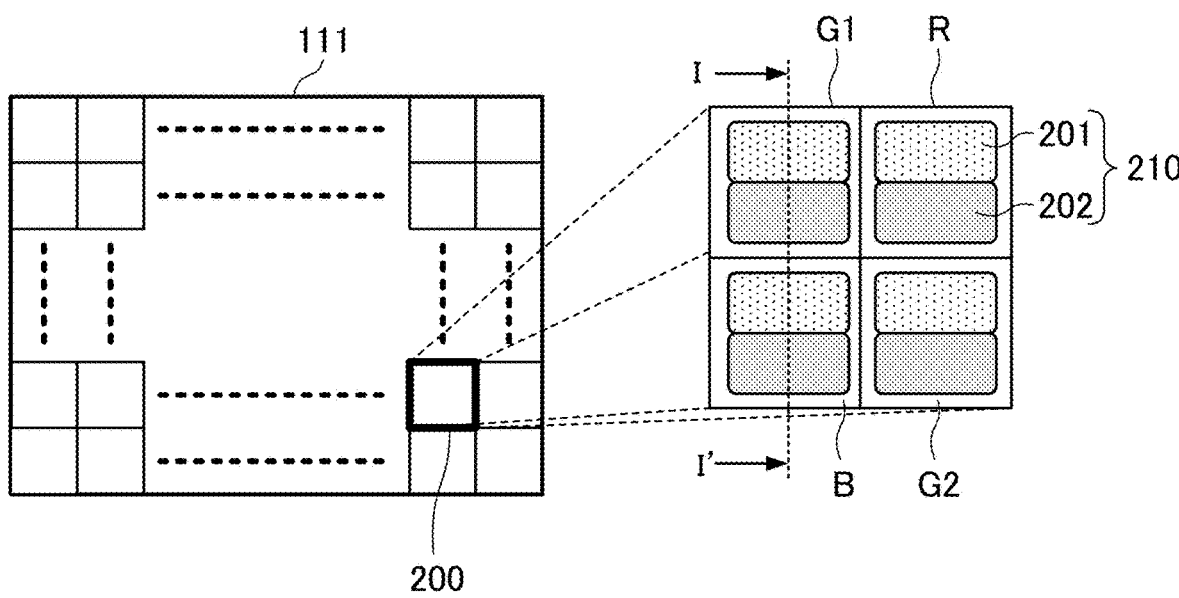
FIGS. 2A and 2B are schematic views showing a configuration example of an imaging element according to the first embodiment.
Figure 2B:
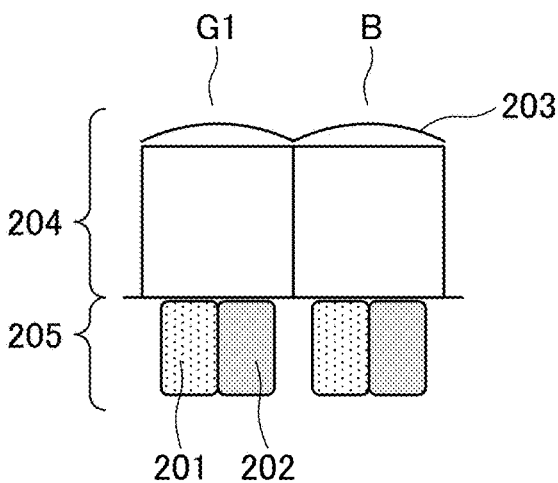

Next, the principle of distance measuring based on an image plane phase difference method using the imaging element 111 will be described. FIG. 2A and 2B are schematic views showing a configuration example of the imaging element 111.

FIG. 2A is a plan view of the imaging element 111 viewed from the direction of light incidence. The imaging element 111 has a plurality of pixels (a plurality of first pixels), and these pixels are disposed in a matrix. Specifically, a plurality of pixel groups 200, each of which is a group of four pixels arranged in two rows and two columns, are arranged in a matrix. The pixel group 200 includes green pixels G1 and G2 that detect green light, a red pixel R that detects red light, and a blue pixel B that detects blue light. In the pixel group 200, the green pixels G1 and G2 are disposed diagonally. One pixel has a first photoelectric conversion region 201 and a second photoelectric conversion region 202 as a pair of photoelectric conversion regions 210.

FIG. 2B is a cross-sectional view of the pixel group 200 taken along line I-I' in FIG. 2A. Each pixel includes a light guiding layer 204 and a light receiving layer 205.

The light guiding layer 204 includes a microlens 203 on the light incident side to efficiently guide a light flux incident on the pixel to the light receiving layer 205. Further, the light guiding layer 204 includes, below the microlens 203, a color filter that transmits light in a wavelength band corresponding to the color of light detected by each pixel, wirings for image reading and pixel driving, and the like.

The light receiving layer 205 is a photoelectric conversion region that photoelectrically converts the light incident through the light guiding layer 204 and outputs it as an electric signal. The light receiving layer 205 has a first photoelectric conversion region 201 and a second photoelectric conversion region 202 as described above.

Figure 4:
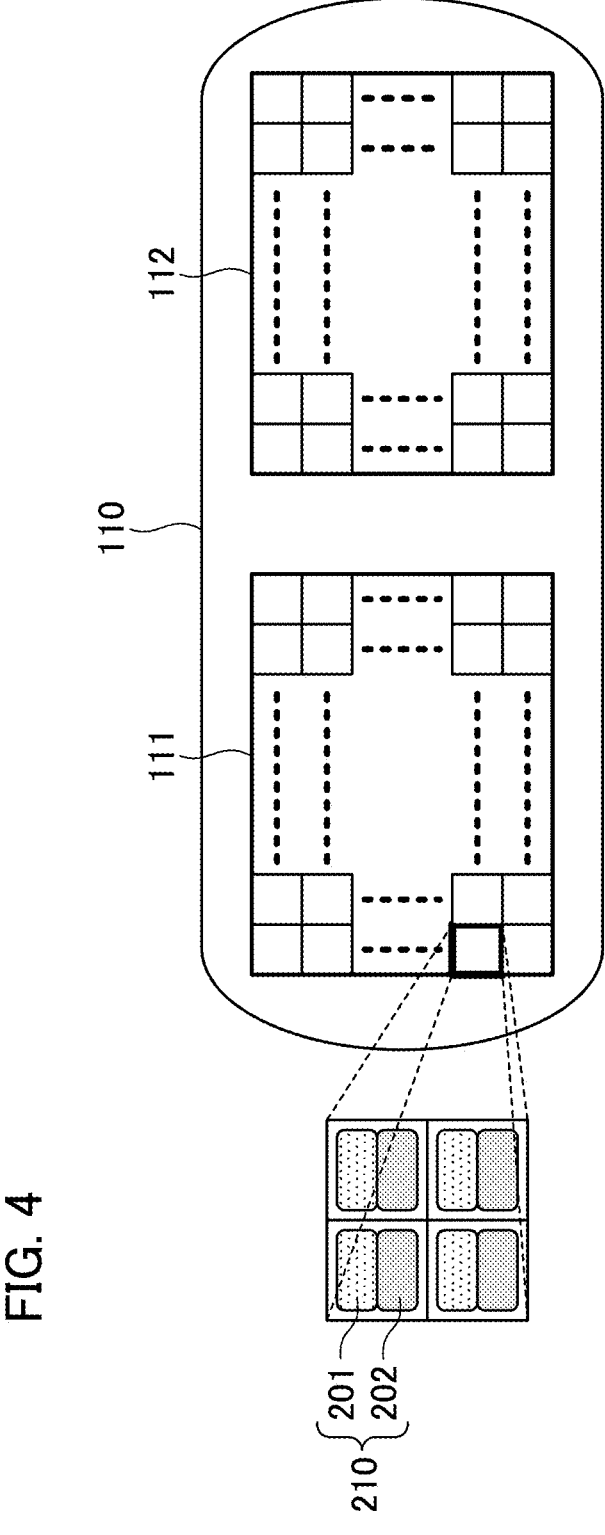
FIG. 4 is a diagram showing the arrangement of two imaging elements in an imaging unit according to the first embodiment.

The imaging element 112 also includes a plurality of pixels (a plurality of second pixels) arranged in a matrix (see FIG. 4). In the imaging element 112, one photoelectric conversion region is provided for each pixel, unlike the photoelectric conversion region of the imaging element 111.

Figure 3A:
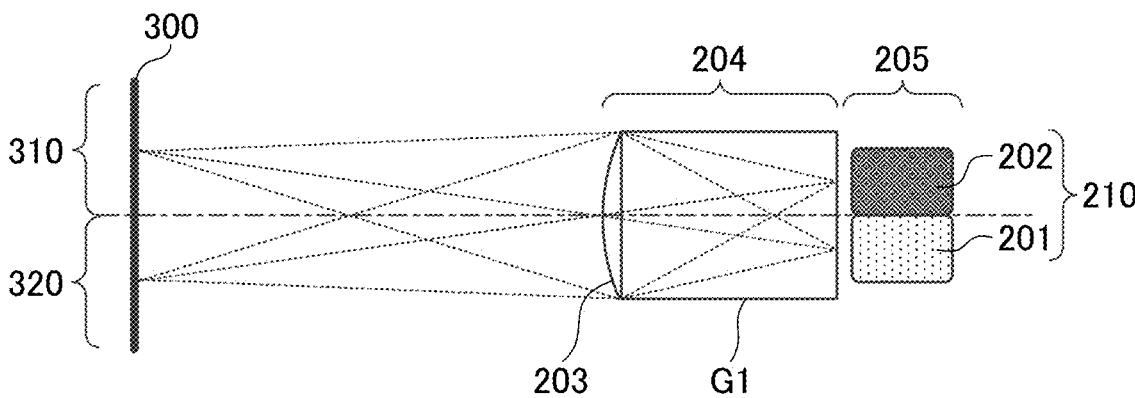
FIGS. 3A, 3B, 3C and 3D are schematic views showing a relationship between an object distance and incident light in an image plane phase difference method.

FIGS. 3A, 3B, 3C and 3D are schematic views showing a relationship between an object distance and incident light in an image plane phase difference method. FIG. 3A is a schematic view showing an exit pupil 300 in an optical system (imaging optical system 330) that forms an optical image on the imaging element 111, a green pixel G1 of the imaging element 111, and light incident on a pair of photoelectric conversion regions 210 of the green pixel G1. Although the green pixel G1 will be described here, the other pixels have similar configurations.

The microlens 203 is disposed such that the exit pupil 300 and the light receiving layer 205 are in an optically conjugate relationship. As a result, a light flux that has passed through a first pupil region 310, which is a partial pupil region included in the exit pupil 300, is incident on the first photoelectric conversion region 201. Similarly, a light flux that has passed through a second pupil region 320, which is a partial pupil region, is incident on the second photoelectric conversion region 202. Incident angles of light on the first photoelectric conversion region 201 and the second photoelectric conversion region 202 are different.

The first photoelectric conversion region 201 of each pixel photoelectrically converts a received light flux and outputs a signal. One image 11a of the image group 11 is generated from signals output from the plurality of first photoelectric conversion regions 201 included in the imaging element 111. The image 11a shows an intensity distribution of an image formed on the imaging element 111 by the light flux that has passed through the first pupil region 310. Similarly, the second photoelectric conversion region 202 of each pixel photoelectrically converts a received luminous flux and outputs a signal. The other image 11b of the image group 11 is generated from signals output from the plurality of second photoelectric conversion regions 202 included in the imaging element 111. The image 11b shows an intensity distribution of an image formed on the imaging element 111 by the light flux that has passed through the second pupil region 320.

Figure 3B:
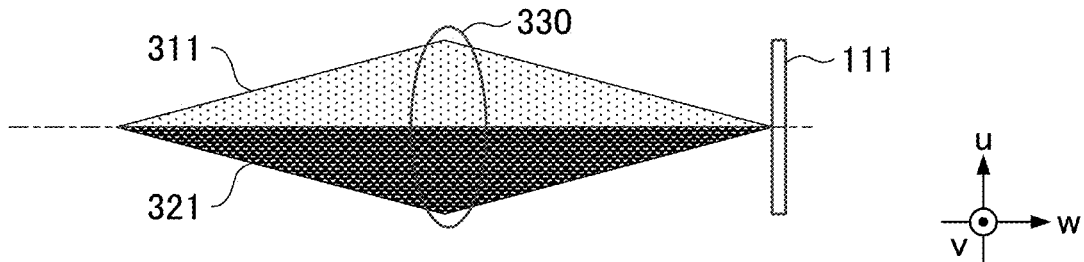
Figure 3C:
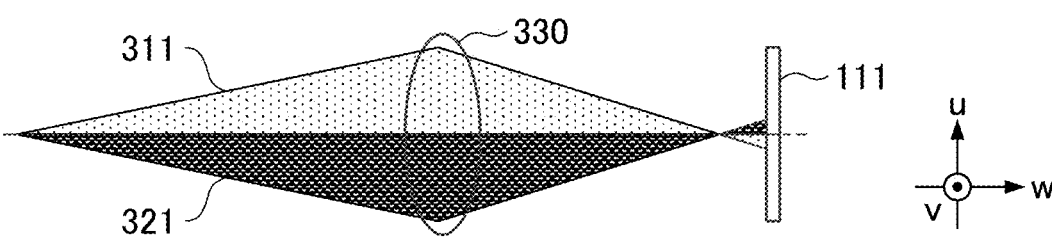
Figure 3D:
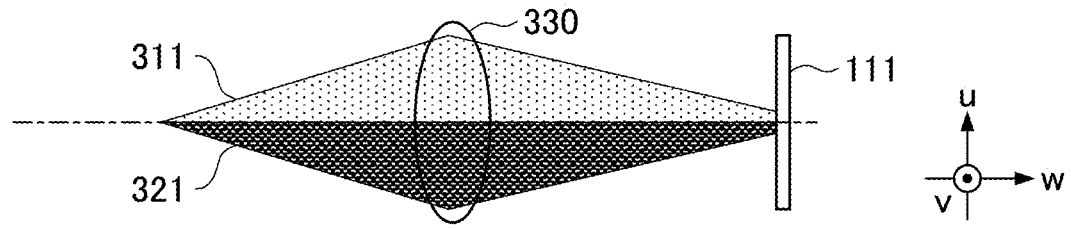

A relative displacement amount (parallax amount) between the images 11a and 11b corresponds to a displacement amount (defocus amount) between an imaging element surface and an imaging position. A relationship between a parallax amount and a defocus amount will be described using FIGS. 3B, 3C, and 3D. FIGS. 3B, 3C, and 3D are schematic views showing the imaging element 111 and the imaging optical system 330 that forms an optical image on the imaging element 111. A first light flux 311 indicates a light flux passing through the first pupil region 310, and a second light flux 321 indicates a light flux passing through the second pupil region 320.

FIG. 3B shows a state at the time of focusing, where the first light flux 311 and the second light flux 321 are converged on the imaging element 111. In this state, a parallax amount between the image 11a formed by the first light flux 311 and the image 11b formed by the second light flux 321 is zero.

FIG. 3C shows a state where defocusing is performed in the negative direction of a w-axis on an image side. In this state, a parallax amount between the image 11a formed by the first light flux 311 and the image 11b formed by the second light flux 321 is not zero, but has a negative value.

FIG. 3D shows a state where defocusing is performed in the positive direction of the w-axis. In this state, a parallax amount between the image 11a formed by the first light flux 311 and the image 11b formed by the second light flux 321 is not zero, but has a positive value.

From comparison between FIGS. 3C and 3D, it can be understood that a direction in which a parallax occurs changes depending on whether a defocus amount is positive or negative. Furthermore, it can be understood from a geometrical relationship that a parallax amount is generated depending on the defocus amount. Thus, a parallax amount between images 11*a* and 11*b* can be detected by, for example, a block matching method, and the parallax amount can be converted into a defocus amount via a predetermined conversion coefficient. Furthermore, a defocus amount on the image side can be converted into distance data to an object by using an imaging formula of the imaging optical system 330.

The above description relates to the principle of distance measuring based on an image plane phase difference method. In this embodiment, the image plane phase difference distance measuring unit 131 generates distance data based on the images 11*a* and 11*b* using an image plane phase difference method.

(Arrangement of Imaging Elements)

Next, a method of disposing the imaging elements 111 and 112 will be described. FIG. 4 is a diagram showing the arrangement of the imaging elements 111 and 112 in the imaging unit 110. In this embodiment, the imaging element 111 and the imaging element 112 are disposed, for example, side by side in a horizontal direction (first direction). Further, the first photoelectric conversion region 201 and the second photoelectric conversion region 202 of the imaging element 111 are disposed in a direction (second direction) intersecting the horizontal direction, for example, in a vertical direction. With this arrangement, a horizontal parallax is obtained by comparing the output image 12 obtained from the imaging element 112 and the calculated image 13 obtained from the imaging element 111, and a vertical parallax is obtained by comparing the images 11*a* and 11*b* obtained from the imaging element 111.

In the block matching method described above, the imaging elements 111 and 112 arranged in the horizontal direction cannot obtain valid parallax information from, for example, objects that change little in the horizontal direction (guardrails, pedestrians, or the like). However, with the configuration shown in FIG. 4, it is possible to obtain two types of parallax information in different directions, and thus no matter what shape an object has, valid parallax information can be obtained from at least one of the image plane phase difference distance measuring unit 131 and the stereo distance measuring unit 132.

As a preferable example in FIG. 4, an arrangement example in which the arrangement direction of the imaging elements 111 and 112 is orthogonal to the arrangement direction of the first photoelectric conversion region 201 and the second photoelectric conversion region 202 is given. However, the present disclosure is not limited thereto, and the arrangement directions may intersect each other.

(Operation of Distance Measuring Unit)

Figure 5A:
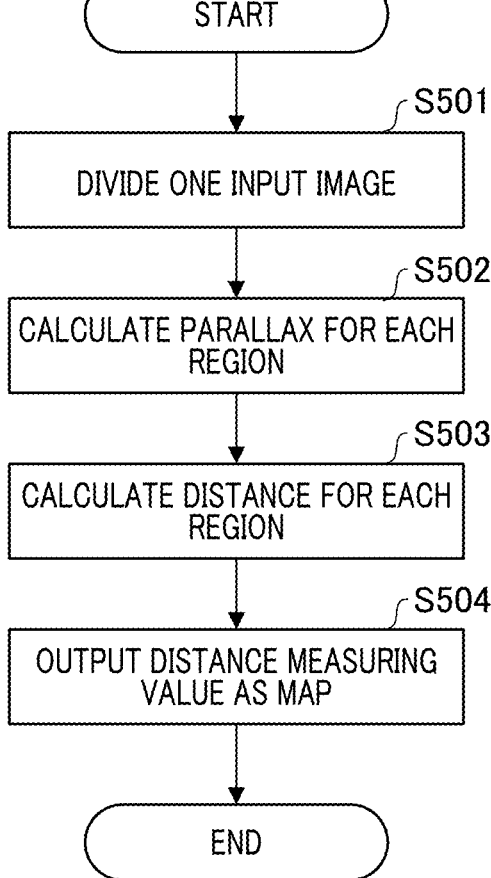
FIGS. 5A and 5B are flowcharts showing an operation of a distance measuring unit according to the first embodiment.
Figure 5B:
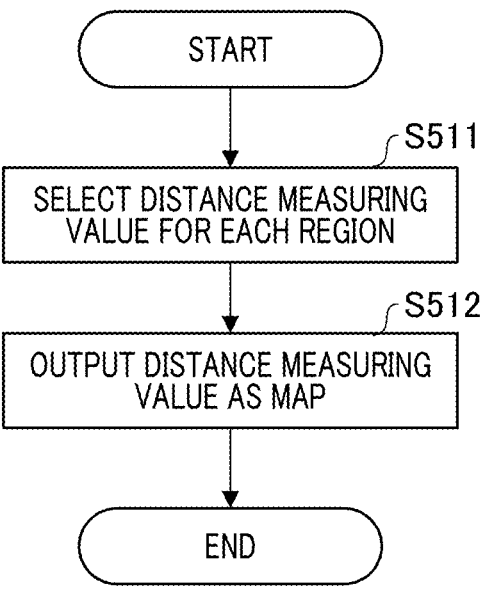

Next, an operation flow in the distance measuring unit 130 will be described. FIGS. 5A and 5B are flowcharts showing the operation. In this operation flow, for example, the SOC/FPGA or the CPU in the distance measuring unit 130 reads a program according to a processing content, expands the program to a predetermined storage region, and executes the program.

FIG. 5A shows a flow of operations executed by both the image plane phase difference distance measuring unit 131 and the stereo distance measuring unit 132. The distance measuring units 131 and 132 use one of two input images as a reference image and divide the other image into a plurality of predetermined regions (S501). The shapes and sizes of the divided regions may be arbitrarily determined depending on a required distance measuring accuracy and processing speed.

Next, each of the distance measuring units 131 and 132 calculates a parallax using the block matching method as described above (S502). Specifically, first, differences are calculated by shifting the divided images in units of pixels with respect to the reference image. Next, the number of pixels shifted at which the sum of absolute differences (or the sum of squares) is minimized is obtained. Finally, the number of pixels is converted into a distance on the imaging plane from known pixel interval information to obtain a parallax.

Here, each of the distance measuring units 131 and 132 may appropriately perform correction processing such as geometric correction on an image which is input to obtain a parallax with high accuracy. This correction processing may be performed by the processing units 121 and 122 at the previous stage. In addition, when the distance measuring map synthesis unit 133 performs distance measuring map synthesis using reliability information, each of the distance measuring units 131 and 132 may add the minimum value of the sum of the absolute differences (or the sum of squares) as the degree of reliability.

Next, each of the distance measuring units 131 and 132 calculates distance information for each region from parallax information obtained for each region and information on the baseline length of the imaging unit 110 which is stored in advance (S503). In the stereo distance measuring unit 132, a relative distance between the imaging elements 111 and 112 is a baseline length. In the image plane phase difference distance measuring unit 131, a value determined by the optical characteristics of the imaging optical system 330 is a baseline length.

Finally, the distance measuring units 131 and 132 output distance information obtained for each region to the distance measuring map synthesis unit 133 as the distance measuring maps 17 and 18 (S504).

Through the above-described flow, each of the distance measuring units 131 and 132 transmits a distance measuring result based on the direction of the parallax thereof (the vertical direction for the image plane phase difference distance measuring unit 131, and the horizontal direction for the stereo distance measuring unit 132) to the distance measuring map synthesis unit 133.

FIG. 5B shows a flow of operations performed by the distance measuring map synthesis unit 133. The distance measuring map synthesis unit 133 calculates a new distance measuring value for each region based on the two input distance measuring maps 17 and 18 (S511). An example of a calculation method is a method in which the pieces of reliability information added in S502 described above are compared, and the reliability information with a higher degree of reliability (a smaller sum of the absolute differences or a smaller sum of squares) is set as a distance measuring result. Alternatively, the calculation may be performed based on only a distance measuring value to be input, such as by selecting a smaller distance measuring value or calculating an average of distance measuring values.

Finally, the distance measuring map synthesis unit 133 outputs a new distance measuring map obtained for each region to the vehicle control unit 140 (S512).

As described above, the distance measuring device 100 according to this embodiment can obtain a parallax in each of both vertical and horizontal directions using the two imaging elements 111 and 112. As a result, highly reliable and stable distance measuring can be performed with as few cameras as possible, regardless of the shape of an object.

Second Embodiment

In the first embodiment, an example in which one of the two imaging elements 111 and 112 constituting the imaging unit 110 is an imaging device compatible with distance measuring using an image plane phase difference method has been described. In a second embodiment, a configuration in which two imaging elements are imaging elements compatible with distance measuring using an image plane phase difference method will be described. In this embodiment, vertical parallax information and two types of horizontal parallax information are obtained. Since the two types of horizontal parallax information have different baseline lengths, distances at which a parallax can be accurately obtained are different.

Figure 6:
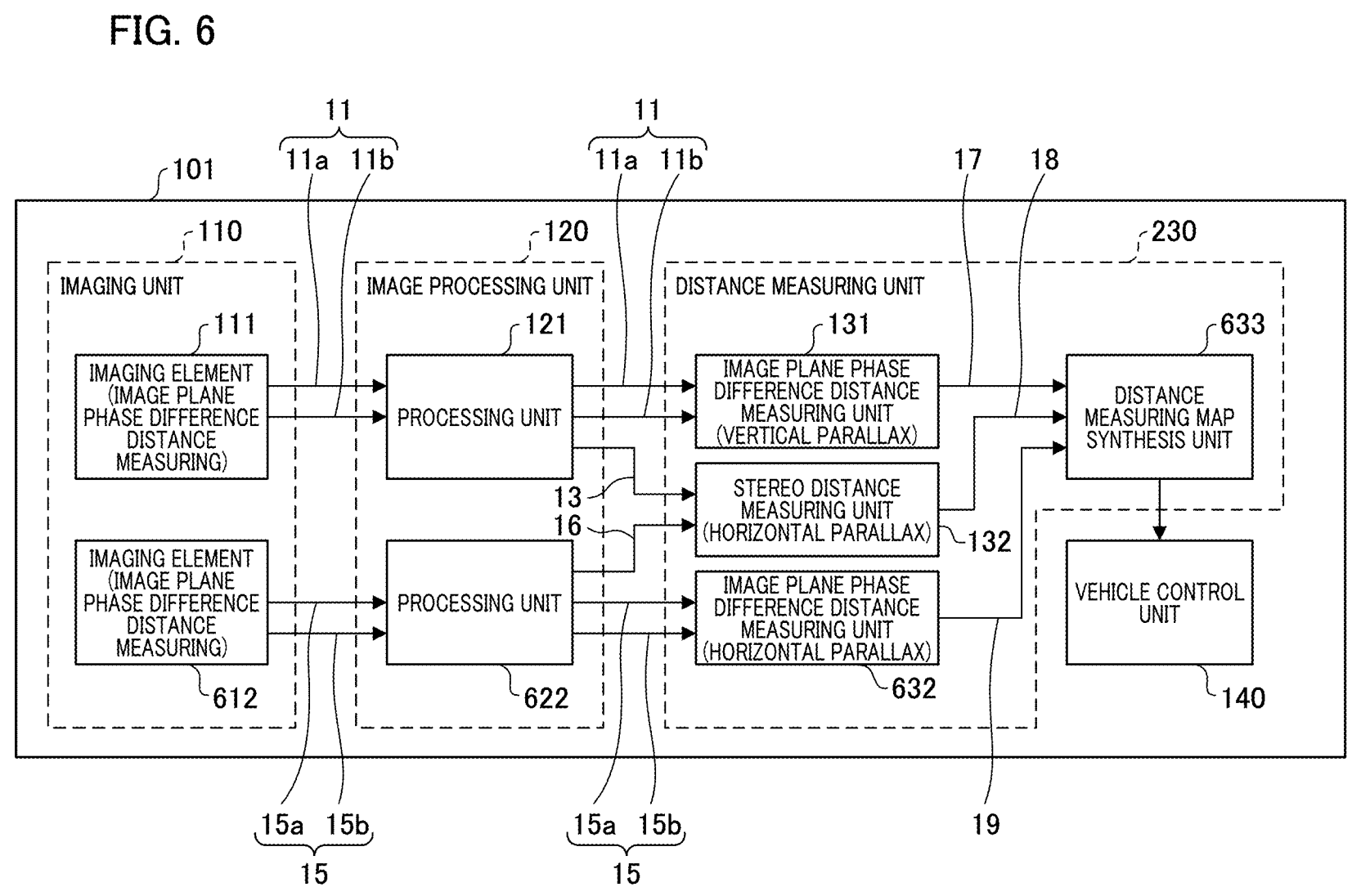

FIG. 6 is a block diagram showing a system configuration of a distance measuring device 101 according to the second embodiment. Descriptions of points similar to those in the first embodiment will be omitted.

An imaging element 612 is an imaging element compatible with distance measuring based on the same type of image plane phase difference method as that of the imaging element 111. However, as will be described later, an arrangement direction of a pair of photoelectric conversion regions 210 is different from that of the imaging element 112.

A processing unit 622 has the same function as that of the processing unit 121. That is, the processing unit 622 generates an image group (second image group) 15, which is a set of two images 15a and 15b having a parallax, based on a video signal received from the imaging element 612. Further, the processing unit 622 generates a calculated image (second calculated image) 16 by performing calculation processing (for example, summation) based on the image group 15.

An image plane phase difference distance measuring unit 632 has the same function as that of the image plane phase difference distance measuring unit 131. That is, the image plane phase difference distance measuring unit 632 calculates parallax information (third parallax information) based on the image group 15 transmitted from the processing unit 622, and generates a distance measuring map 19.

Distance measuring result information input to a distance measuring map synthesis unit 633 includes three types of distance measuring maps 17, 18, and 19, but other functions and operation flows are the same as in the first embodiment. The distance measuring map synthesis unit 633 generates a new distance measuring map based on the distance measuring maps 18, 17, and 19 obtained from the stereo distance measuring unit 132 and the image plane phase difference distance measuring units 131 and 632, respectively, and transmits the new distance measuring map to the vehicle control unit 140. Specifically, as in the first embodiment, there are a method of selecting a distance measuring value based on reliability degree information for each region, and a method of selecting a smaller distance measuring value. Alternatively, the distance measuring map synthesis unit 633 may preferentially select one predetermined type of distance measuring map from among the three distance measuring maps 17, 18, and 19, and complementarily use the other two types of distance measuring maps only for regions where no valid distance measuring map can be obtained.

Figure 7:
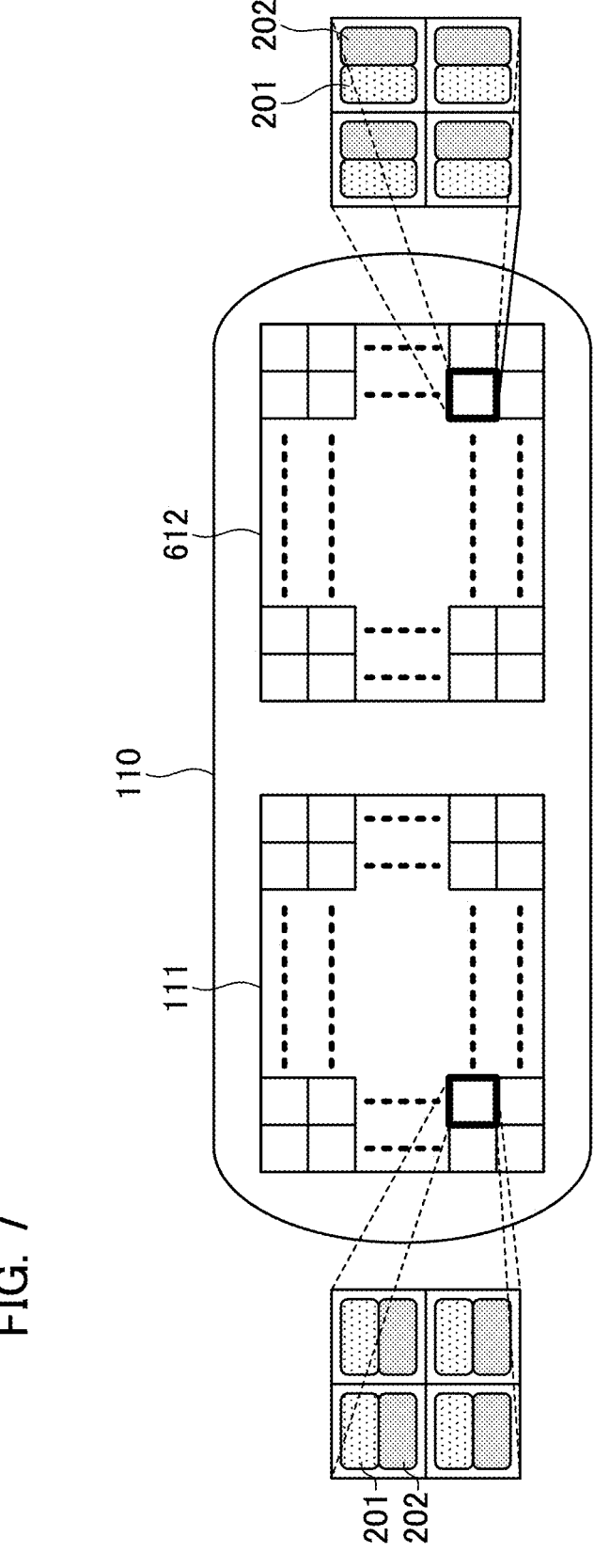
FIG. 7 is a diagram showing the arrangement of two imaging elements in an imaging unit according to the second embodiment.

FIG. 7 is a diagram showing the arrangement of the imaging elements 111 and 612 in the imaging unit 110. In this embodiment, the imaging elements 111 and 612 are disposed side by side in the horizontal direction. The first photoelectric conversion region 201 and the second photoelectric conversion region 202 of the imaging element 111 are disposed side by side in a vertical direction, and the photoelectric conversion regions of the imaging element 612 are disposed side by side in a horizontal direction. With such an arrangement, a first horizontal parallax can be obtained by comparing two images 15a and 15b having a parallax, and a second horizontal parallax can be obtained by comparing the calculated images 13 and 16. Further, a vertical parallax can be obtained by comparing two images 11a and 11b having a parallax.

According to this embodiment, it is possible to obtain the same effects as in the first embodiment described above and obtain the following effects. By arbitrarily adjusting a distance between the imaging elements 111 and 612 or the imaging optical system 330, the first horizontal parallax and the second horizontal parallax can be obtained with different baseline lengths. In general, in a stereo camera, the longer the baseline length, the more accurately an object at a long distance can be measured. However, when an object at a short distance is imaged with a configuration having a long baseline length, an angle at which a distance measuring target is imaged varies, and thus, when the target is a three-dimensional object, the shape of a to-be-obtained image will vary. As a result, it is considered that a parallax cannot be obtained because an image cannot be matched. On the other hand, in this embodiment, a plurality of distance measuring results with different baseline lengths are combined for a horizontal parallax, and thus, in addition to the effects obtained in the first embodiment, it is possible to perform highly accurate distance measuring over a wider distance range.

As a modification example of this embodiment, the stereo distance measuring unit 132 may be omitted. In this case, a distance measuring unit 230 generates the distance measuring map 17 based on a vertical parallax in the image plane phase difference distance measuring unit 131, and generates the distance measuring map 19 based on a horizontal parallax (third parallax information) in the image plane phase difference distance measuring unit 632. Then, the distance measuring maps are synthesized by the distance measuring map synthesis unit 633. In this case, although it is not possible to obtain a plurality of pieces of horizontal parallax information having different baseline lengths, there is an advantage that stereo distance measuring using the two imaging elements 111 and 612 is not required. In general, a stereo camera using two cameras requires geometric correction processing for correcting an optical axis deviation between two imaging elements and lens distortion. On the other hand, in the case of distance measuring using an image plane phase difference method, imaging is performed on the same imaging surface, and thus highly accurate distance measuring can be performed without performing geometric correction. Additionally, in a stereo camera, it is necessary to dispose two imaging elements at a certain interval, which requires securing an installation space therefor and strict management of relative positions. However, in the case of an image plane phase difference method, imaging is performed on the same imaging surface, which makes it possible to avoid these problems.

Third Embodiment

In the first and second embodiments, description has been given of an example in which stable distance measuring can be performed no matter what shape an object has by generating a plurality of distance measuring maps from images having a parallax in different directions. On the other hand, image matching required for parallax calculation includes searching for a position where a difference is minimized by slightly shifting one image with respect to the other image, and repeating this processing for each region of an image, and thus a processing load tends to increase. These processes are performed in the SOC/FPGA or the CPU, but when the processes are performed using hardware, there is a concern that circuit resources will increase, and when the processes are performed using software, there is a concern that a frame rate will decrease. Consequently, in the second embodiment, a description is given of an example in which it is possible to select which image is used to calculate a parallax from among a plurality of input images in accordance with the surrounding situation of the vehicle or a driving situation by providing a new switching unit, thereby reducing a processing load.

Figure 8:
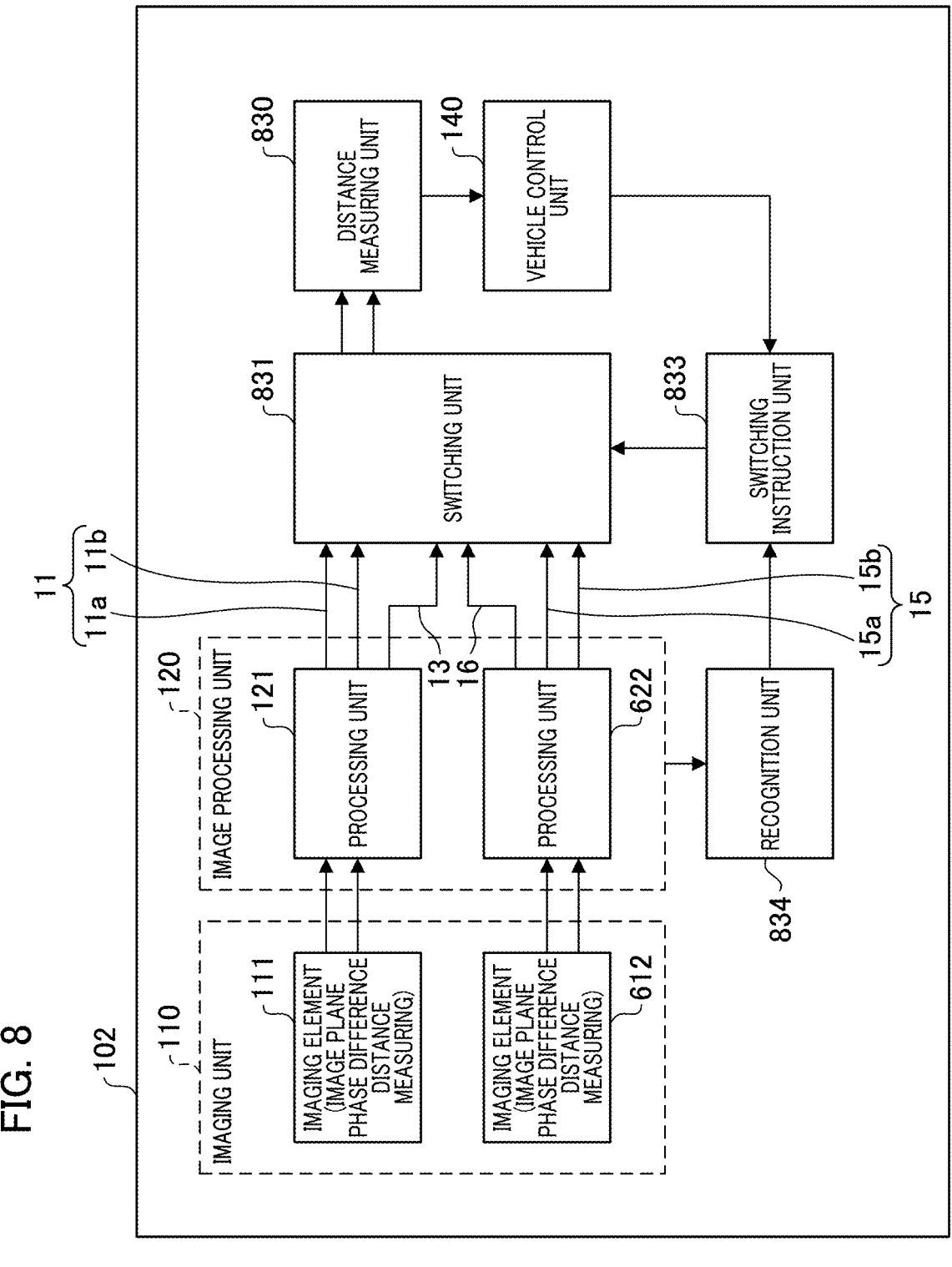
FIG. 8 is a block diagram showing a system configuration of a distance measuring device according to a third embodiment.

FIG. 8 is a block diagram showing a system configuration of a distance measuring device 102 according to a third embodiment. Descriptions of points similar to those in the first embodiment or the second embodiment will be omitted.

The distance measuring device 102 includes a recognition unit 834, a switching unit 831, a switching instruction unit 833, and a distance measuring unit 830. The switching unit 831, the distance measuring unit 830, and the switching instruction unit 833 operate in, for example, an SOC/FPGA or a CPU.

The switching unit (selection means, switching means) 831 switches a plurality of pieces of information processed by an image processing unit 120 and outputs them to the distance measuring unit 830. Specifically, the switching unit 831 receives three sets of image information (an image group 11 with a vertical parallax, an image group 15 with a horizontal parallax, and calculated images 13 and 16) from the image processing unit 120. Then, the switching unit 831 selects which one set is output based on an instruction received from the switching instruction unit 833, which will be described later. The number of sets of images input to the switching unit 831 may be reduced to two depending on a configuration of a distance measuring device 100. For example, there are two sets of inputs in the first embodiment, and there are three sets of inputs in the second embodiment.

The distance measuring unit 830 has the same function as the above-described image plane phase difference distance measuring unit 131, stereo distance measuring unit 132, and image plane phase difference distance measuring unit 632. The distance measuring unit 830 selects one block corresponding to the set of images selected by the switching unit 831 from among the three blocks and causes it to function. In other words, the distance measuring map synthesis unit 133 and 633 in the first and second embodiments are unnecessary. The distance measuring unit 830 calculates a parallax for each region using a method such as a block matching method based on, for example, two input images, and converts the parallax into a distance measuring map based on information on a baseline length. The distance measuring map is transmitted to a vehicle control unit 140.

The switching instruction unit 833 instructs the switching unit 831 which set of images should be used for distance measuring based on the surrounding situation of the vehicle and a driving situation. Specifically, information (for example, the type and number) regarding an object being imaged by the imaging unit 110 is received from the recognition unit (recognition means) 834, which will be described later, and the determination is performed in accordance with the information regarding the object. For example, when a vehicle is shown, the switching instruction unit 833 instructs the switching unit 831 to select a set of images (image group 11) including a vertical parallax whose parallax makes it possible to effectively calculate a parallax from edges in the horizontal direction. Alternatively, when a large number of pedestrians, signs, and the like are shown, the switching instruction unit 833 instructs the switching unit 831 to select a set of images (image group 15) including a horizontal parallax making it possible to effectively perform parallax calculation from edges in the vertical direction.

The recognition unit 834 acquires the information (for example, the type and number) regarding the object based on a captured image received from the image processing unit 120 (at least one of the processing unit 122 and the processing unit 622), and transmits it to the switching instruction unit 833. Examples of a recognition method include a method using machine learning represented by deep learning, and the like.

Alternatively, it is also possible to adopt a configuration (detection means) in which the switching instruction unit 833 can acquire a vehicle traveling speed from the vehicle control unit 140, and instruct the switching unit 831 in accordance with a traveling speed. For example, when the vehicle speed is higher than a predetermined speed, it is necessary to measure a distant place with higher accuracy, and thus the switching instruction unit 833 instructs the switching unit 831 to select a set of images (calculated images 13 and 16) that include a parallax with a long baseline length.

Figure 9:
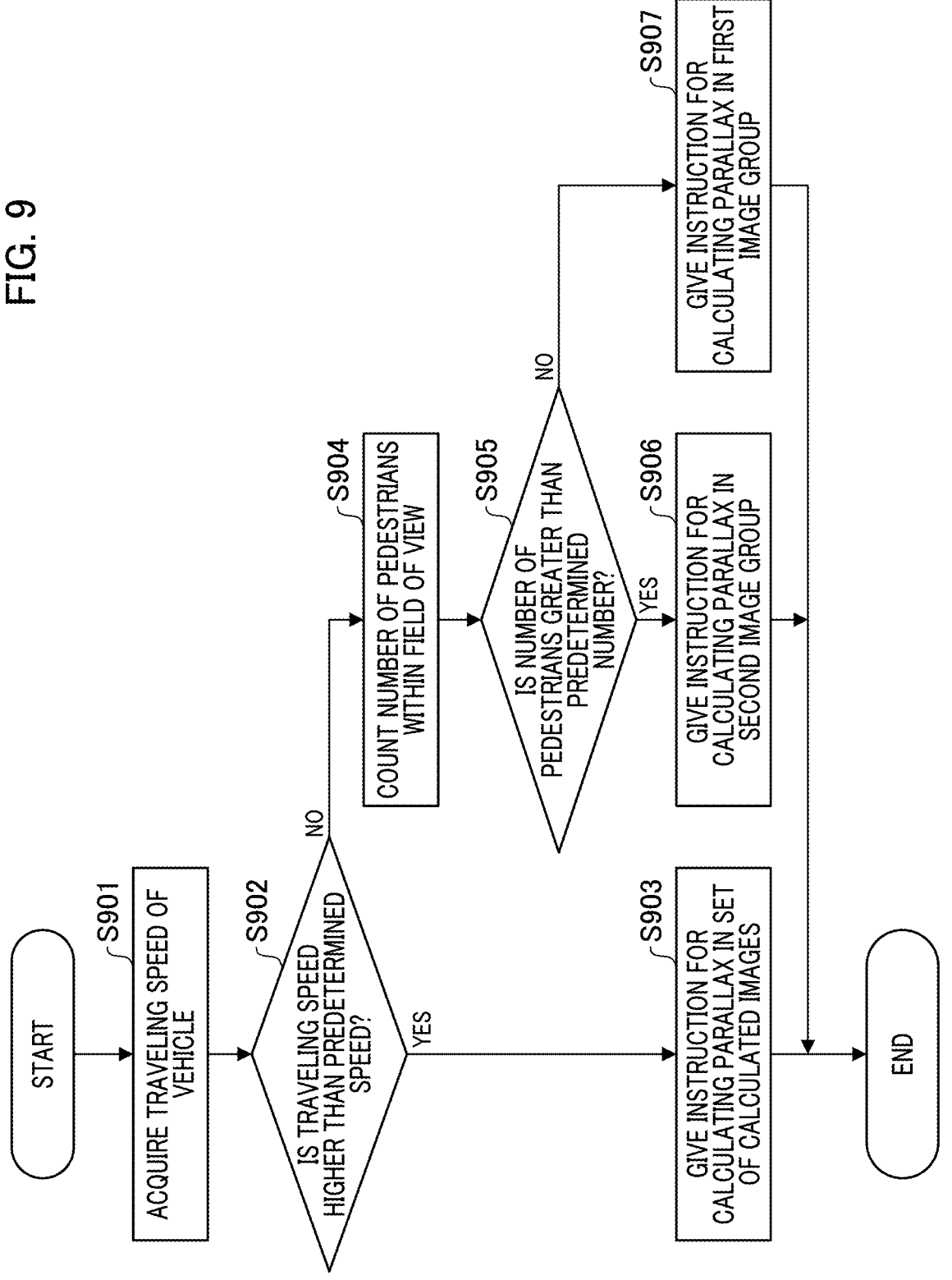
FIG. 9 is a flowchart showing an operation of a switching instruction unit in the third embodiment.

FIG. 9 is a flowchart showing operations performed by, for example, the SOC/FPGA or the CPU in the switching instruction unit 833.

First, the switching instruction unit 833 acquires a vehicle travel speed from the vehicle control unit 140 (S901). The switching instruction unit 833 determines whether the acquired speed is higher than a predetermined speed (S902), and when the acquired speed is higher, the switching instruction unit 833 instructs the switching unit 831 to select a set of images (calculated images 13 and 16) that have a parallax with a long baseline length (S903).

When the acquired speed is lower than the predetermined speed, the switching instruction unit 833 acquires a captured image from the image processing unit 120 and counts the number of pedestrians within the field of view (S904). The switching instruction unit 833 determines whether the number of pedestrians is greater than a predetermined number (S905), and when the number of pedestrians is greater, the switching instruction unit 833 instructs the switching unit 831 to select an image group 15 (second image group), which is a set of images including a horizontal parallax (S906). Otherwise, the switching instruction unit 833 instructs the switching unit 831 to select an image group 11 (first image group), which is a set of images including a vertical parallax (S907).

Although the number of pedestrians is used as an example of a determination material in S904 and S905, the present disclosure is not limited thereto, and can be appropriately changed to recognizable objects such as signs, street trees, buildings, and vehicles, or a combination thereof.

According to the above-described operation flow, the distance measuring device 102 can select a set of images making it possible to effectively calculate a parallax in accordance with a driving situation and the surrounding environment. As a result, the number of distance measuring units is reduced, and thus a processing load on the distance measuring device 102 can be reduced.

Other Embodiments

In each of the embodiments described above, a vehicle that can travel on public roads is used as an example of a moving object. However, the moving object may be an automated guided vehicle (AGV) or an autonomous mobile robot (AMR) that travels in a predetermined location or within a facility.

In each of the above-described embodiments, an example in which all pixels included in the imaging element 112 for image plane phase difference distance measuring, and the like, have a pair of photoelectric conversion regions 210 has been described. However, a configuration may be adopted in which, among all of the pixels of the imaging element for image plane phase difference distance measuring, only pixels in a specific region may have a pair of photoelectric conversion regions 210. Furthermore, the arrangement and number of red, green, and blue colors of the pixels of the imaging element can be changed as appropriate. Further, the number of photoelectric conversion regions included in one pixel is not limited to two (one pair), but may be three or more.

Although the present disclosure has been described above in detail based on its preferred embodiments, the present disclosure is not limited to the above embodiments, and various modifications can be made based on the gist of the present disclosure, and these are not excluded from the scope of the present disclosure.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-033169, filed Mar. 3, 2023, which is hereby incorporated by reference herein in its entirety.

What is claimed is:

1. A distance measuring device comprising:
   a first imaging element including a first pixel having a plurality of photoelectric conversion regions;
   a second imaging element including a second pixel and having a first parallax in a first direction between the second imaging element and the first imaging element;
   a memory storing instructions; and
   a processor executing the instructions causing the distance measuring device to generate integrated distance measuring information based on signals output from the first imaging element and the second imaging element,
   wherein the plurality of photoelectric conversion regions have a second parallax in a second direction intersecting the first direction,
   wherein the processor generates the integrated distance measuring information based on (1) first distance measuring information generated based on the second parallax and (2) second distance measuring information generated based on the first parallax,
   wherein the processor (1) generates a first image group having the second parallax based on the signal output from the first imaging element, (2) generates a second image group having the first parallax based on at least the signal output from the second imaging element, and (3) generates the integrated distance measuring information based on (a) the first distance measuring information generated based on the first image group and (b) the second distance measuring information generated based on the second image group,
   wherein the distance measuring device is mounted on a moving object,
   wherein the processor selects information for generating the integrated distance measuring information from a plurality of pieces of information depending on a situation of the moving object, and
   wherein the processor selects information regarding one of the first image group and the second image group, and generates the integrated distance measuring information based on the selected one image group.

* * * * *